US007605881B2

(12) United States Patent
Kim et al.

(10) Patent No.: US 7,605,881 B2
(45) Date of Patent: Oct. 20, 2009

(54) LIQUID CRYSTAL DISPLAY APPARATUS AND CONTROL METHOD THEREOF

(75) Inventors: Hyun-suk Kim, Suwon-si (KR); Jin-bog Kim, Taean-eup (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 296 days.

(21) Appl. No.: 11/108,879

(22) Filed: Apr. 19, 2005

(65) Prior Publication Data

US 2005/0237292 A1 Oct. 27, 2005

(30) Foreign Application Priority Data

Apr. 27, 2004 (KR) ..................... 10-2004-0028940

(51) Int. Cl.
*G02F 1/1335* (2006.01)

(52) U.S. Cl. ............................ 349/68; 349/65; 349/69; 345/102

(58) Field of Classification Search ................. 345/102, 345/87; 349/65, 68, 69
See application file for complete search history.

(56) References Cited

U.S. PATENT DOCUMENTS 6,828,954 B2 * 12/2004 Yoshihara et al. ........... 345/102
2002/0057412 A1 5/2002 Ashizawa et al.
2002/0070914 A1 6/2002 Bruning et al.
2003/0090455 A1 5/2003 Daly
2004/0246275 A1 * 12/2004 Yoshihara et al. ........... 345/690
2005/0231459 A1 * 10/2005 Furukawa ................... 345/102
2005/0259064 A1 * 11/2005 Sugino et al. ............... 345/102
2006/0050047 A1 * 3/2006 Jin et al. ...................... 345/102
2006/0192747 A1 * 8/2006 Yoon et al. .................. 345/102

FOREIGN PATENT DOCUMENTS

GB 2 369 730 A 6/2002
JP 6-67159 A 3/1994
JP 10-307286 A 11/1998
JP 2000-321571 A 11/2000

(Continued)

OTHER PUBLICATIONS 54.2: A High Dynamic Range Display Using Low and High Resolution Modulators, Helge Seetzen and Lorne A. Whitehead, SID 03 Digest, pp. 1450-1453, 2003.

*Primary Examiner*—David Nelms
*Assistant Examiner*—Thanh-Nhan P Nguyen
(74) *Attorney, Agent, or Firm*—Sughrue Mion, PLLC

(57) ABSTRACT

An LCD apparatus includes a backlight array in which a plurality of light emitting devices illuminate an LCD panel with a plurality of colors; a backlight driver driving each light emitting device to emit light and adjust light intensity; a signal analyzer analyzing an input video signal and outputting transform objective information on the basis of an analyzed result; and a controller controlling the backlight driver to adjust a display state of a picture displayed on the LCD panel on the basis of the transform objective information from the signal analyzer. A picture is displayed on an LCD panel to have wide range colors of color coordinates and includes a backlight unit having a short response time. A display state of a picture displayed on the LCD panel is adjusted by analyzing an input video signal and controlling a backlight unit.

15 Claims, 5 Drawing Sheets

FOREIGN PATENT DOCUMENTS

| | | | |
|---|---|---|---|
| JP | 2001-66569 | A | 3/2001 |
| JP | 2002-099250 | | 4/2002 |
| JP | 2002-140038 | | 5/2002 |
| KR | 2001-99545 | A | 11/2001 |
| KR | 2002-41401 | A | 6/2002 |
| KR | 10-0388582 | B1 | 6/2003 |
| KR | 10-0415510 | B1 | 1/2004 |
| WO | 03/077013 | A2 | 9/2003 |

* cited by examiner

LIQUID CRYSTAL DISPLAY APPARATUS AND CONTROL METHOD THEREOF

CROSS-REFERENCE TO RELATED APPLICATIONS

This application claims the benefit of Korean Patent Application No. 2004-28940, filed Apr. 27, 2004, in the Korean Intellectual Property Office, the disclosure of which is incorporated herein by reference.

BACKGROUND OF THE INVENTION

1. Field of the Invention

The present invention relates to a method and apparatus of controlling a liquid crystal display (LCD), and, more particularly, to an apparatus and method of controlling an LCD which comprises a backlight array on which a plurality of light emitting devices illuminating an LCD display panel with a plurality of colors are arranged in a predetermined pattern, and wherein the backlight array is controlled to adjust a display state of a picture.

2. Description of the Related Art

Among display apparatuses, an LCD apparatus uses a liquid crystal cell of which an inherent molecular arrangement is rearranged when a voltage is applied thereto. Such molecular rearrangement causes optical properties such as birefringence, line light, dichroism, light scattering, etc., thereby modulating light and displaying a picture.

As compared with other display apparatus such as a plasma display panel (PDP), a field emission display (FED), etc., the LCD apparatus cannot emit light itself but instead adjusts the light passing through an LCD panel, so that a separate light source is needed.

Therefore, the LCD apparatus includes a backlight unit to illuminate the LCD panel. Generally, the backlight unit includes a lamp used as a light source, a light guided panel changing light emitted from the lamp into a surface light source and enhancing photo-efficiency and brightness, a prism sheet, and an optical sheet such as a polarizer.

The lamp used as the light source is generally a fluorescent lamp such as a cold cathode fluorescent lamp (CCFL), a hot cathode fluorescent lamp (HCFL), or the like, which emits white light.

However, in an LCD apparatus using a fluorescent lamp, the whole region of color coordinates may not be available due to optical properties of the light emitted from the fluorescent lamp.

Further, the fluorescent lamp may have a long response time to a control signal of an inverter, so that the brightness, etc. thereof is not immediately adjusted as soon as the inverter outputs the control signal.

SUMMARY OF THE INVENTION

Accordingly, an exemplary aspect of the present invention provides an LCD apparatus and a control method thereof, which allows a picture displayed on an LCD panel to have wide range colors of color coordinates and which includes a backlight unit having a short response time.

Another exemplary aspect of the present invention provides an LCD apparatus and a control method thereof, in which a display state of a picture displayed on an LCD panel is adjusted by analyzing an input video signal and controlling a backlight unit.

According to an exemplary embodiment of the present invention, an LCD apparatus with an LCD panel displaying a picture thereon is provided, including a backlight array in which a plurality of light emitting devices illuminating the LCD panel with a plurality of colors are arranged in a predetermined pattern, a backlight driver driving each light emitting device to emit light and adjust light intensity, a signal analyzer analyzing an input video signal and outputting a transform objective information on the basis of an analyzed result, and a controller controlling the backlight driver to adjust a display state of a picture displayed on the LCD panel on the basis of the transform objective information from the signal analyzer.

In an exemplary embodiment, the light emitting device includes a red light emitting diode, a green light emitting diode, and a blue light emitting diode. It is contemplated that the signal analyzer detects whether each pixel corresponding to the video signal is a transform objective pixel distributed within a preset transform objective region of color coordinates, and transform objective information is provided that includes information about the transform objective pixel. The transform objective information also may include information about the coordinates corresponding to the transform objective pixel on the backlight array, information about whether the light emitting diode positioned corresponding to the coordinates among the light emitting diodes emits light, and information about the light intensity.

According to an exemplary embodiment, the video signal includes a brightness signal and a color difference signal, and the signal analyzer determines whether the light emitting diode positioned corresponding to the coordinates among the light emitting diodes emits light and what degrees of the intensity the light will have, on the basis of at least one of the brightness signal and the color difference signal.

According to an exemplary embodiment, the transform objective region includes at least one of a white region and a black region in the color coordinates. The controller may control the backlight driver to turn off the light emitting diode of the backlight array corresponding to the pixel distributed within the black region in the case where the signal analyzer determines that the pixel of the input video signal is distributed within the black region. According to an embodiment, the transform objective region has an approximately elliptical shape in the color coordinates. The transform objective region may be defined in the color coordinates on the basis of distribution of a memorial color matched with a predetermined objective.

According to a further exemplary embodiment of the present invention, a method of controlling an LCD apparatus with an LCD panel displaying a picture thereon is disclosed. The method includes providing a backlight array in which a plurality of light emitting devices illuminating the LCD panel with a plurality of colors are arranged to have a predetermined pattern, analyzing an input video signal and detecting transform objective information on the basis of an analyzed result, and controlling the light emitting device to emit light and adjust light intensity to adjust a display state of a picture displayed on the LCD panel on the basis of the transform objective information.

According to an exemplary embodiment, providing the backlight array includes arranging a plurality of red light emitting diodes, a plurality of green light emitting diodes, and a plurality of blue light emitting diodes to have a predetermined pattern.

Detecting the transform objective information includes detecting whether a pixel corresponding to the video signal is a transform objective pixel distributed within a preset transform objective region of color coordinates, calculating information about the coordinates corresponding to the transform objective pixel on the backlight array, information about whether the light emitting diode positioned corresponding to the coordinates among the light emitting diodes emits light, and information about the light intensity.

It is contemplated that the transform objective region includes at least one of a white region and a black region in the color coordinates, and controlling the light emitting device to emit light and adjust light intensity includes turning off the light emitting diode corresponding to the transform objective pixel distributed within the black region in the case where the transform objective pixel is distributed within the black region.

BRIEF DESCRIPTION OF THE DRAWINGS

The above and other aspects and features of the present invention will become more apparent from the following description of illustrative, non-limiting embodiments of the present invention, taken in conjunction with the accompany drawings in which.

Figure 1:
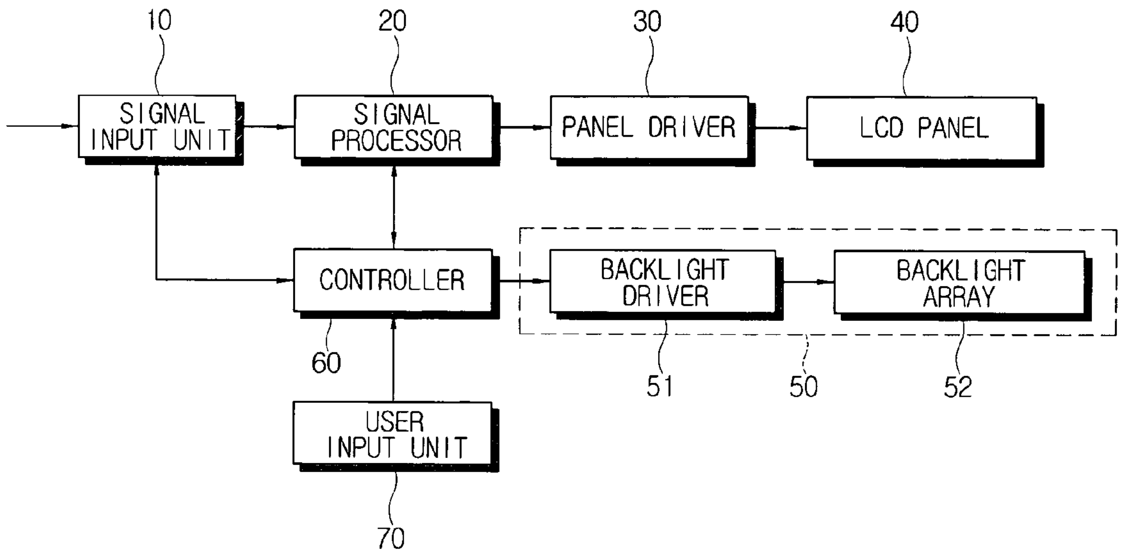
FIGS. 1 and 2 are block diagrams of an LCD apparatus according to an embodiment of the present invention.

DETAILED DESCRIPTION OF ILLUSTRATIVE, NON-LIMITING EMBODIMENTS OF THE PRESENT INVENTION

Reference will now be made in detail to illustrative, non-limited embodiments of the present invention, examples of which are illustrated in the accompanying drawings, wherein like reference numerals refer to like elements throughout. The exemplary embodiments are described below with reference to the figures.

As shown in FIG. 1, an LCD apparatus according to an embodiment of the present invention includes a signal input unit 10, a signal processor 20, a panel driver 30, an LCD panel 40, a backlight unit 50, and a controller 60 that controls them.

The LCD panel 40 includes a first substrate formed with a switching device and a pixel electrode; a second substrate formed with R, G, and B color filters; and a liquid crystal sandwiched between the first and second substrates. A signal from the panel driver 30 is transmitted to the switching device via a source printed circuit board (PCB) and a gate PCB of the first substrate. Thus, an electric signal is applied to the liquid crystal to transmit or intercept light emitted from a backlight array 52 or to adjust an amount of the transmitted light, thereby displaying a picture.

Figure 2:
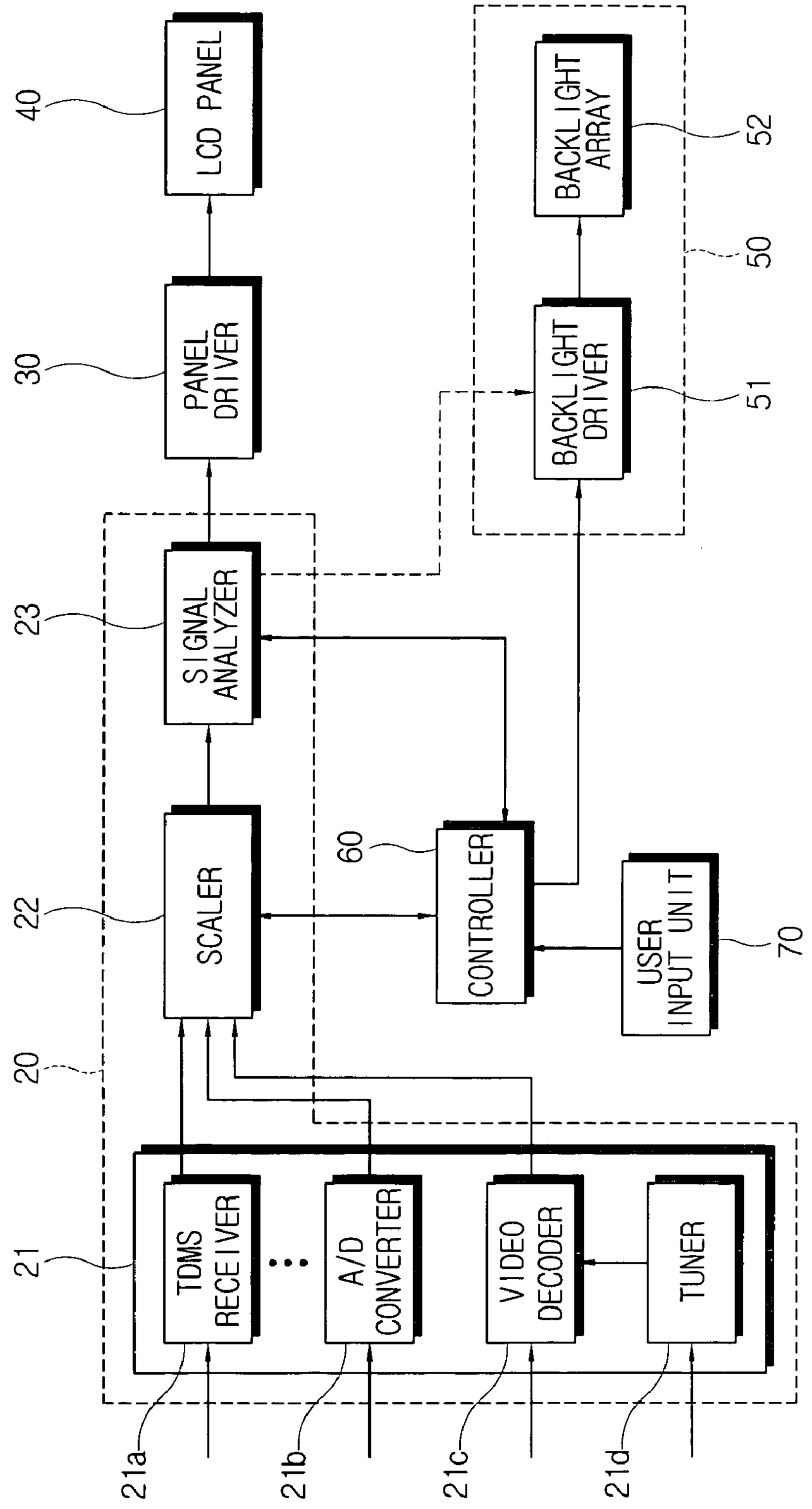

The signal processor 20 transforms a video signal input through the signal input unit 10 into a video signal having a format adaptive to a display part, namely the LCD panel 40. According to an exemplary embodiment of the present invention, the signal processor 20, as shown in FIG. 2, comprises a scaler 22 and a signal transformer 21 converting the video signal input through the signal input unit 10 into a signal suitable for the scaler.

According to an exemplary embodiment, the signal transformer 21 comprises a tuner 21*d* tuning in a signal selected from among broadcast (radio frequency or "RF") signals input through an antenna (not shown) or a cable (not shown), and a video decoder 21*c* transforming the broadcast signal selected by the tuner 21*d* to a signal having a format suitable for the scaler 22. Further, the signal transformer 21 may include a transition minimized differential signaling (TMDS) receiver 21*a*, an analog/digital (A/D) converter 21*b*, etc. to process a video signal inputted from an external video apparatus such as a digital video disc (DVD) player, a VCR (video cassette recorder), or the like.

The scaler 22 may transform the video signal output from the signal transformer 21 to have a vertical frequency, resolution, aspect ratio, etc., adaptive to an output scale.

The signal input unit 10 receives the video signal and transmits it to the signal processor 20. Here, the signal input unit 10 has various configurations corresponding to those of the aforementioned signal transformer 21. For example, the signal input unit 10 may include an analog input terminal to receive and transmit an input analog video signal to the A/D converter 21*b* and a digital input terminal to support a low-voltage differential signaling (LVDS) or TMDS interface for a digital video signal input. Further, the signal input unit 10 may include the aforementioned antenna or cable to receive the broadcast signals through the tuner 21*d*.

Further, the signal processor 20 according to an exemplary embodiment includes a signal analyzer 23. The signal analyzer 23 analyzes the video signal output from the scaler 22 and outputs transform objective information corresponding to the analyzed result. It is contemplated that the signal analyzer 23 detects whether each pixel based on the video signal is a transform objective pixel distributed within a preset transform objective region (e.g., A1, A2, A3 in FIG. 5) of color coordinates and outputs information about the detected transform objective pixel as transform objective information. Detailed descriptions of the transform objective information and a method of detecting such in an exemplary signal analyzer 23 will be described later.

The backlight unit 50 according to an exemplary embodiment comprises the backlight array 52 and a backlight driver 51, and emits light to the LCD panel 40, thereby allowing the LCD panel 40 to display a picture. The backlight array 52 includes a plurality of light emitting devices to illuminate with a plurality of colors. The light emitting device according to an embodiment of the present invention includes a light emitting diode (LED). Here, the LED separately includes an R-LED emitting red light, a G-LED emitting green light, and a B-LED emitting blue light. The LED may be a united LED which can selectively emit all red light, green light, and/or blue light. Thus, a picture displayed on the LCD panel 40 may have wide range colors of color coordinates. Furthermore, the backlight array 52 may realize a short response time for control of the backlight driver 51.

Figure 3:
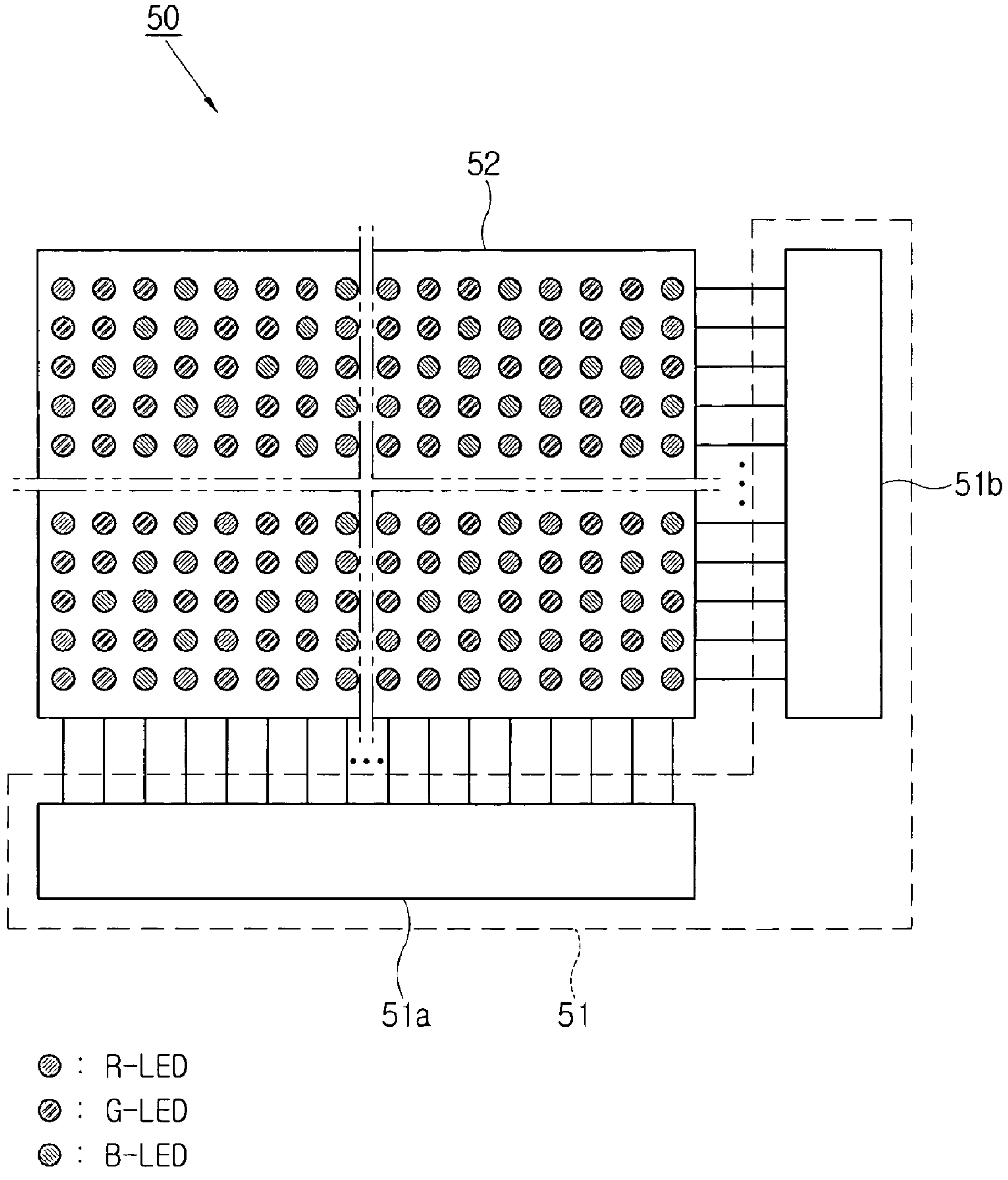
FIG. 3 illustrates a backlight unit according to an embodiment of the present invention.

The respective R-, G-, and B-LEDs may be arranged to have a predetermined pattern on the backlight array 52 as shown in FIG. 3. For example, the respective R-, G-, and B-LEDs may have a pattern of "R-G-G-B -R-G-G-B-R-G-G-B . . . " along a transverse direction of the LCD panel 40. The respective R-, G-, and B-LEDs may also have a pattern of "R-G-B . . . ", "R-R-G . . . ", or "R-G-B-B . . . ", or the like, for example. The respective R-, G-, and B-LEDs are arranged to have an optimum arrangement pattern in consideration of the properties thereof such as maximum brightness, etc., thereby allowing the LCD panel 40 to display a picture with natural color. The light emitting diodes (R-LED, G-LED, B-LED) may be arranged as compact as the corresponding pixels of the LCD panel 40. Thus, color or brightness of a picture displayed on the LCD panel 40 is emphasized according to an irradiating LED among the respective R-, G-, and B-LEDs disposed behind each pixel or a light intensity thereof, thereby enhancing picture contrast.

The backlight driver 51 drives the respective R-, G-, and B-LEDs to emit light or not emit light and to adjust the intensity of the emitted light in response to a control signal from the controller 60. The backlight driver 51 adjusts the intensity of electric current to be applied to the respective R-, G-, and B-LEDs, and therefore adjusts the intensity of the light emitted from the respective R-, G-, and B-LEDs. It is contemplated that the backlight driver 51 includes a horizontal driver 51*a* and a vertical driver 51*b* to drive the respective R-, G-, and B-LEDs to emit light and to adjust the light intensity thereof in response to the control signal transmitted from the controller. Therefore, the respective R-, G-, and B-LEDs are controlled to emit the light and to adjust the light intensity thereof on the basis of a combination of signals transmitted from the horizontal driver 51*a* and the vertical driver 51*b*. The controller 60 controls the backlight driver 51 to transform the display state of a picture displayed on the LCD panel 40 on the basis of the transform objective information.

Figure 4:
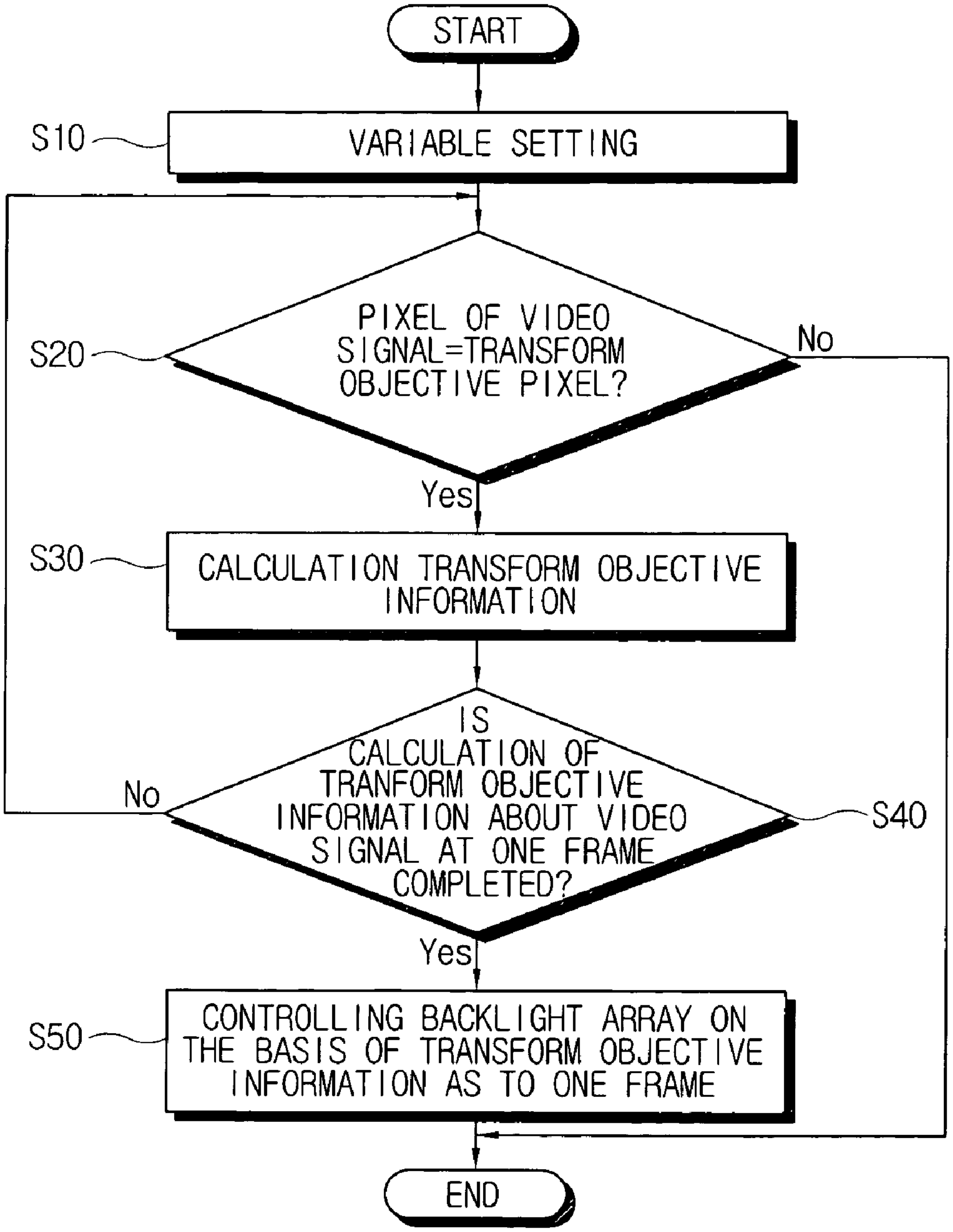
FIG. 4 is a flowchart of control of an LCD apparatus according to an embodiment of the present invention.

An exemplary method of controlling the LCD apparatus will now be described with reference to FIG. 4.

In S20, the signal analyzer 23 receives a video signal including a brightness signal and a color difference signal, and the signal analyzer 23 detects whether each pixel based on the video signal is a transform objective pixel distributed within a preset transform objective region A1, A2, A3 of the color coordinates.

For example, a method of detecting whether each pixel based on the video signal is a transform objective pixel distributed within the preset transform objective region A1, A2, A3 of the color coordinates may be as follows:

First, in S10, the signal analyzer 23 may be previously set to have a variable defining the transform objective region A1, A2, A3 in the color coordinates. For example, when the transform objective region A1, A2, A3 has an elliptical shape, the transform objective region A1, A2, A3 is determined in the color coordinates with the variables such as a major axis, a minor axis, an origin, an area, etc. to geometrically define the elliptical shape. Then, coordinates of the pixel in the color coordinates are calculated on the basis of the brightness signal and the color difference signal. On the basis of the calculated coordinates for the pixel and the variables to define the transform objective region A1, A2, A3, it is detected whether the pixel is the transform objective pixel distributed in the transform objective region A1, A2, A3.

Figure 5:
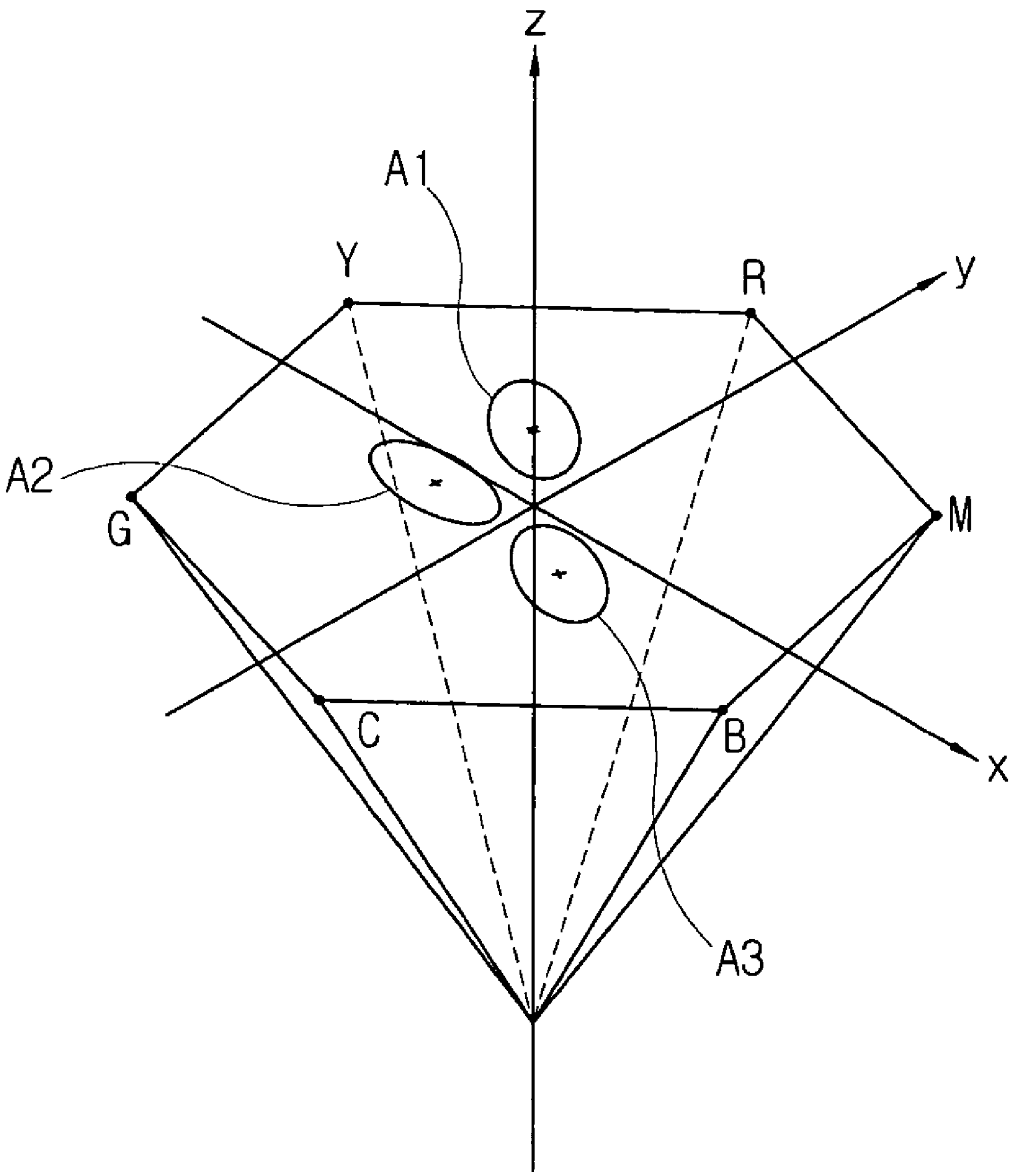
FIG. 5 depicts color coordinates for illustrating a transform objective region according to an embodiment of the present invention.

FIG. 5 illustrates the transform objective region A1, A2, A3 in a YCbCr color coordinates among the color coordinates, for example. The transform objective region A1, A2, A3 according to an exemplary embodiment of the present invention is defined by a set of the plurality of colors in the color coordinates. Here, the transform objective region A1, A2, A3 may be defined by a geometrical equation such as an elliptical equation in the color coordinates so as to easily determine the transform objective region A1, A2, A3 and calculate the transform objective pixel.

Further, the transform objective region A1, A2, A3 may be defined on the basis of distribution of a memorial color matched with a predetermined objective. A memorial color may mean an inherent color of an object such as a familiar thing, which is perceived by a user. According to an exemplary embodiment of the present invention, a skin color, a color of the sky, and/or a color of grass (or a dark green) may be employed as the memorial color. However, other objects such as the sun, etc. may provide the memorial color. Generally, the memorial color is, as shown in FIG. 5, distributed as a substantially elliptical shape in brightness, color and saturation coordinates. In the color coordinates shown in FIG. 5, the transform objective regions A1, A2 and A3 are, by way of example, based on the skin color, the sky blue, and the dark green, respectively.

Meanwhile, when it is determined at S20 that the pixel is the transform objective pixel, the coordinates on the backlight array 52 corresponding to a position of the transform objective pixel on the LCD panel 40 are calculated. Thus, the respective R-, G-, and B-LEDs of the backlight array 52 corresponding to the position of the transform objective pixel on the LCD panel 40 are determined.

Then, on the basis of transform values preset as to the transform objective regions A1, A2 and A3, it is calculated whether the respective R-, G-, and B-LEDs emit light and what degree of intensity the light will have. For example, in the case where the transform objective region A1, A2 and A is of the sky blue, the B-LED among the R-, G-, B-LEDs corresponding to the transform objective pixel is adjusted to have high intensity of light or is adjusted in the ratio of the light intensity relative to the R-LED and the G-LED.

Therefore, in S30, there is calculated the transform objective information about the coordinates on the backlight array 52 corresponding to the respective calculated transform objective pixel, whether or not the corresponding LED emits light, and the light intensity of the LED.

At S40, when the transform objective information about the pixel is completely calculated at one frame of the video signal, at operation S50, the controller 60 controls the backlight driver 51 to drive the respective R-, G-, and B-LEDs of the backlight array 52 on the basis of the transform objective information with respect to one frame, thereby adjusting the display state of a picture displayed on the LCD panel 40.

Additionally, the transform objective region A1, A2, A3 according to an exemplary embodiment of the present invention may include a black region or a white region. When the signal analyzer 23 determines that the pixel of the input video signal is distributed within the black region, the controller 60 may control the backlight driver 51 to drive the respective R-, G-, and B-LEDs corresponding to the pixel distributed within the black region to stop emitting the light. Alternately, when the signal analyzer 23 determines that the pixel of the input video signal is distributed within the white region, the controller 60 may control the backlight driver 51 to drive the respective R-, G-, and B-LEDs corresponding to the pixel distributed within the white region to be increased in the light intensity. Thus, the contrast of a picture displayed on the LCD panel 40 is enhanced.

Referring to FIGS. 1 and 2, the LCD apparatus according to an exemplary embodiment of the present invention further includes a user input unit 70 allowing a user to input a control signal. At this time, a user can input the foregoing transform value through the user input unit 70.

Further, a user can control the backlight unit 50 through the user input unit 70. For example, when a user adjusts the brightness of a picture displayed on the LCD panel 40 through the user input unit 70, the controller 60 controls the backlight driver 50 to adjust the brightness.

Here, the user input unit 70 may include a selection button (not shown) provided in a front of or on the LCD apparatus and a signal generator generating a control signal when the selection button is pressed. Further, the user input unit 70 may include a remote controller and a remote signal receiver generating a control signal in response to a remote signal received from the remote controller. The user input unit 70 may have any suitable configuration as long as the user input unit 70 can transmit a control signal to the controller 60.

In the foregoing illustrative, non-limiting embodiment, the signal processor 20 includes the signal analyzer 23. However, the signal analyzer 23 may be provided separately from the signal processor 20. For example, the signal processor 20 and the signal analyzer 23 may be incorporated into one chipset or may be provided as separate chipsets.

According to an exemplary embodiment of the present invention, the transform objective information is transmitted from the signal analyzer 23 to the controller 60, and the controller 60 controls the backlight driver 51 on the basis of the transmitted transform objective information, wherein the transform objective information may be partially transmitted from the signal analyzer 23 to the backlight driver 51.

Thus, there are provided the backlight array 52 in which the plurality of light emitting devices illuminating the LCD panel 40 with the plurality of colors are arranged to have a predetermined pattern; the backlight driver 51 drives each light emitting device to emit light and adjusts the light intensity;

the signal analyzer 23 analyzes the input video signal and outputs the transform objective information on the basis of the analyzed result; and the controller 60 controls the backlight driver 51 to adjust the display state of a picture displayed on the LCD panel 40 on the basis of the transform objective information from the signal analyzer 23 so that the display state of a picture displayed on the LCD panel 40 can be adjusted by analyzing the input video signal and controlling the backlight unit 50.

As described above, the present invention provides a method and apparatus of controlling an LCD which allows a picture displayed on an LCD panel to have wide range colors of color coordinates and includes a backlight unit having a short response time.

Further, the present invention provides a method and apparatus of controlling an LCD, in which a display state of a picture displayed on an LCD panel is adjusted by analyzing an input video signal and controlling a backlight unit.

Although illustrative, non-limiting embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A LCD apparatus with a LCD panel, comprising:

a backlight array comprising a plurality of light emitting devices that illuminate the LCD panel with a plurality of colors;

a backlight driver which drives the plurality of light emitting devices to emit light and adjusts the intensity of the light emitted by at least one of said light emitting devices driven to emit light;

a signal analyzer which analyzes an input video signal and that outputs transform objective information on the basis of an analyzed result; and a controller which controls the backlight driver to adjust a display state of a picture displayed on the LCD panel based on the transform objective information from the signal analyzer.

2. The LCD apparatus according to claim 1, wherein each of the light emitting devices comprises a red light emitting diode, a green light emitting diode, and a blue light emitting diode.

3. The LCD apparatus according to claim 2, wherein the signal analyzer detects whether each pixel corresponding to the video signal is a transform objective pixel distributed within a preset transform objective region of color coordinates, and the transform objective information includes information about the transform objective pixel.

4. The LCD apparatus according to claim 3, wherein the transform objective information includes information about coordinates which correspond to the transform objective pixel on the backlight array, information about whether a light emitting diode positioned to correspond to the transform objective pixel, among the plurality of light emitting diodes, emits light and information about the light intensity.

5. The LCD apparatus according to claim 4, wherein the video signal comprises a brightness signal and a color difference signal, and the signal analyzer determines whether the light emitting diode positioned to correspond to the transform objective pixel, among the plurality of light emitting diodes, emits light and what degree of intensity the light will have, based on at least one of the brightness signal and the color difference signal.

6. The LCD apparatus according to claim 3, wherein the transform objective region comprises at least one of a white region and a black region in the color coordinates.

7. The LCD apparatus according to claim 6, wherein the controller controls the backlight driver to turn off the light emitting diode of the backlight array corresponding to a pixel distributed within the black region when the signal analyzer determines that the pixel of the input video signal is distributed within the black region.

8. The LCD apparatus according to claim 3, wherein the transform objective region has a substantially elliptical shape in the color coordinates.

9. The LCD apparatus according to claim 8, wherein the transform objective region is defined in the color coordinates on the basis of distribution of a memorial color matched with a predetermined objective.

10. The LCD apparatus according to claim 1, wherein the plurality of colors are arranged to have a predetermined pattern.

11. A method of controlling a LCD apparatus with a LCD panel, the method comprising:

providing a backlight array comprising a plurality of light emitting devices that illuminate the LCD panel with a plurality of colors;

analyzing an input video signal and detecting transform objective information on the basis of an analyzed result; and controlling the light emitting devices to emit light and adjusting the intensity of the light emitted by at least one of said light emitting devices controlled to emit light so as to adjust a display state of a picture displayed on the LCD panel based on the transform objective information.

12. The method according to claim 11, wherein the providing the backlight array comprises arranging a plurality of red light emitting diodes, a plurality of green light emitting diodes, and a plurality of blue light emitting diodes in a predetermined pattern.

13. The method according to claim 12, wherein the detecting the transform objective information comprises:

detecting whether a pixel corresponding to the video signal is a transform objective pixel distributed within a preset transform objective region of color coordinates; and calculating information about the coordinates which correspond to the transform objective pixel on the backlight array, information about whether a light emitting diode, positioned to correspond to the transform objective pixel, among the light emitting diodes, emits light and information about the light intensity.

14. The method according to claim 12, wherein the transform objective region comprises at least one of a white region and a black region in the color coordinates, and the controlling the light emitting device to emit light and adjust light intensity includes turning off the light emitting diode corresponding to the transform objective pixel distributed within the black region when the transform objective pixel is distributed within the black region.

15. The method according to claim 11, wherein the plurality of colors are arranged to have a predetermined pattern.

* * * * *

UNITED STATES PATENT AND TRADEMARK OFFICE

CERTIFICATE OF CORRECTION

PATENT NO. : 7,605,881 B2
APPLICATION NO. : 11/108879
DATED : October 20, 2009
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 845 days.

Signed and Sealed this

Fifth Day of October, 2010

David J. Kappos
*Director of the United States Patent and Trademark Office*